(12) United States Patent
Bowers et al.

(10) Patent No.: US 6,318,925 B1
(45) Date of Patent: Nov. 20, 2001

(54) VEHICLE COMPONENT ESCUTCHEON

(75) Inventors: Lee N. Bowers, Fairborn, OH (US); Shinichi Yone, Utsunomiya (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/504,278

(22) Filed: Feb. 15, 2000

Related U.S. Application Data (60) Provisional application No. 60/171,946, filed on Dec. 23, 1999.

(51) Int. Cl.$^7$ .............................. B25G 3/18; F16B 21/00; F16D 1/00
(52) U.S. Cl. ..................... 403/325; 403/282; 403/329
(58) Field of Search .................... 403/325, 326, 403/329, 282; 74/473.3, 473.15

(56) References Cited

U.S. PATENT DOCUMENTS

| | | | |
|---|---|---|---|
| 3,473,404 | 10/1969 | Ross | 74/491 |
| 3,722,927 * | 3/1973 | Miska | 285/317 |
| 4,354,566 * | 10/1982 | Yuda | 180/68 P |
| 4,446,809 | 5/1984 | Dennis | 116/28.1 |
| 4,712,341 | 12/1987 | Harris, Jr. et al. | 52/208 |
| 4,865,501 | 9/1989 | Ferris | 411/340 |
| 4,964,359 | 10/1990 | Richmond | 116/28.1 |
| 4,980,803 | 12/1990 | Richmond et al. | 362/23 |
| 5,186,069 | 2/1993 | Asano et al. | 74/477 |
| 5,289,621 | 3/1994 | Kaneko | 24/453 |
| 5,372,415 | 12/1994 | Tisbo et al. | 312/108 |
| 5,417,126 | 5/1995 | DeCrouppe et al. | 74/475 |
| 5,505,103 | 4/1996 | Nordstrom et al. | 74/473 P |
| 5,540,180 | 7/1996 | Kataumi et al. | 116/28.1 |
| 5,560,253 | 10/1996 | Ishikawa et al. | 74/473 R |
| 5,566,582 | 10/1996 | Beadle et al. | 74/475 |
| 5,582,073 | 12/1996 | Takeuchi et al. | 74/475 |
| 5,588,329 * | 12/1996 | Nedachi | 74/473 R |
| 5,623,124 | 4/1997 | Chien | 174/53 |
| 5,848,855 | 12/1998 | Roossien | 403/329 |
| 5,887,485 * | 3/1999 | VanOrder et al. | 74/473.15 |

FOREIGN PATENT DOCUMENTS

| | | |
|---|---|---|
| 44 29 972 C1 | 12/1995 | (DE) . |
| 0 279 087 B1 | 3/1991 | (EP) . |
| 61-239313 | 10/1986 | (JP) . |
| 6-137425 | 5/1994 | (JP) . |
| 709413 | 1/1980 | (RU) . |

* cited by examiner

*Primary Examiner*—Lynne H. Browne
*Assistant Examiner*—John B. Walsh
(74) *Attorney, Agent, or Firm*—Lahive & Cockfield, LLP (57) ABSTRACT

An escutcheon and vehicle console assembly characterized by an assembly arrangement wherein resilient locking tabs serve to facilitate locking and disengagable cooperation between an escutcheon and console and prevent rattling of the escutcheon relative to the console.

15 Claims, 4 Drawing Sheets

VEHICLE COMPONENT ESCUTCHEON

RELATED APPLICATION

This United States Patent Application claims priority in relation to applicants' United States Provisional Patent Application Ser. No. 60/171,946, filed Dec. 23, 1999, and entitled "Vehicle Component Escutcheon".

GENERAL BACKGROUND

A current design of an escutcheon for a vehicle transmission shifter console features a two piece system. The bottom part of this system performs the functional, console-defining aspect of the design. The top part serves more of a decorative function. Typically, the bottom and top parts are joined together by a snap fit.

This current design employs a snap fit arrangement to prevent unintentional separation of the console and cover. However, this design makes the cover difficult to assemble and difficult to disassemble. Also, this design does not prevent the console and cover from rattling against each other, but rather relies on close manufacturing tolerances of the cover and console to prevent such a rattle.

BACKGROUND OF INVENTION

Representative prior art dealing with vehicle component escutcheon arrangements include the following:

| Country | Patent | Inventor(s) | Date |
| --- | --- | --- | --- |
| U.S. | 3,473,404 | Ross | 10/1969 |
| U.S. | 4,446,809 | Dennis | 5/1984 |
| U.S. | 4,712,341 | Harris, Jr. et al | 12/1987 |
| U.S. | 4,865,501 | Ferris | 9/1989 |
| U.S. | 4,964,359 | Richmond | 10/1990 |
| U.S. | 4,980,803 | Richmond et al | 12/1990 |
| U.S. | 5,186,069 | Asano et al | 2/1993 |
| U.S. | 5,289,621 | Kaneko | 3/1994 |
| U.S. | 5,339,501 | Gugle et al | 8/1994 |
| U.S. | 5,372,415 | Tisbo et al | 12/1994 |
| U.S. | 5,417,126 | DeCrouppe et al | 5/1995 |
| U.S. | 5,505,103 | Nordstrom et al | 4/1996 |
| U.S. | 5,540,180 | Kataumi et al | 7/1996 |
| U.S. | 5,560,253 | Ishikawa et al | 10/1996 |
| U.S. | 5,566,582 | Beadle et al | 10/1996 |
| U.S. | 5,582,073 | Takeuchi et al | 12/1996 |
| U.S. | 5,623,124 | Chien | 4/1997 |
| U.S. | 5,848,855 | Roosien | 12/1998 |
| EPO | 0279087A1 | | 8/1988 |
| Germany | 4429972C1 | | 12/1995 |
| Japan | 61-239313A | | 10/1986 |
| Japan | 6137425A | | 5/1994 |
| Russian Federation | 709413 | | 1/1980 |

GENERAL SUMMARY OF THE INVENTION

In one major aspect, the invention is considered to reside in the following combination:

An apparatus is provided for securably connecting an escutcheon to a shifter base of a motor vehicle, this apparatus comprising:

first and second extensions extending outwardly from the shifter base, the escutcheon having first and second holes corresponding to the first and second extensions extending from the shifter base; and at least one tab formed in the shifter base for biasing the escutcheon into engagement with one of the first and second extensions, with this at least one tab providing spring support for holding the escutcheon rigidly against the shifter base.

Another independently significant aspect of the invention involves the following combination:

An apparatus for securably connecting an escutcheon to a shifter base of a motor vehicle, and comprising:

first, second, third, and fourth extensions extending outwardly from the shifter base;

the escutcheon having first, second, third, and fourth holes corresponding to the first, second, third, and fourth extensions extending from the shifter base;

first and second tabs formed in the shifter base for biasing the escutcheon into engagement with said first and second extensions;

each of the first and second tabs defining a lock tab extending inwardly from an outer edge of the shifter base in opposition to one of the first and second extensions;

the lock tab having
a body portion connected to the shifter base and
a lower extension portion extending from the body portion;

the escutcheon forcing the body portion down until one of the first and second extensions fits into one of the first and second holes;

the lower extension portion providing residual spring force to bias the escutcheon upwardly against one of the first and second extensions to create a tight fit;

third and fourth tabs formed in the shifter base for biasing the escutcheon into engagement with the third and fourth extensions, each of the third and fourth tabs defining a second lock tab extending outwardly from the shifter base parallel to one of the third and fourth extensions, the second lock tab having
a body portion connected to the shifter base, and
a lower extension portion extending from said body portion;

the escutcheon forcing the body portion down until one of the third and fourth extensions fits into one of the third and fourth holes;

the body portion of the second lock tab providing residual spring force to bias the escutcheon upwardly to create a tight fit, and the lower extension portion providing residual spring force to bias the escutcheon inwardly against one of the third and fourth extensions to create a tight fit.

Yet another significant aspect of the invention resides in the following combination concept:

An apparatus for securably connecting a trim member to a body component of a motor vehicle which comprises:

at least one extension extending outwardly from the body component;

the trim member having at least one hole corresponding to the at least one extension extending from the body component; and at least one tab formed in the body component for biasing the trim member into engagement with the at least one extension, with the at least one tab providing spring support for holding the trim member rigidly against the body component.

Additionally, a further independently significant facet of the invention resides in a combination as follows:

An interactive vehicle console area to be covered and an escutcheon comprising:

a vehicle including
   a vehicle area to be covered;
an escutcheon operable to
   be manually and detachably engaged with the vehicle area,
   be manually removed from the vehicle area, and
   be restrained from rattling in response to the detachable engagement with the vehicle area;
at least one locking lug, carried by the vehicle area, and including
   an escutcheon camming face, and
   an escutcheon locking face;
at least one recess face defining a locking lug receiving recess carried by the escutcheon; and
at least one locking tab carried by the vehicle area and including
   a spring portion operable to resiliently deflect away from the escutcheon in response to engagement of the escutcheon with the vehicle area in the course of initiating the detachable engagement with the vehicle area, and
   an escutcheon biasing extension operable to resiliently urge the recess face, defining the locking lug receiving recess, into biasing engagement with the escutcheon locking face and restrain the escutcheon from rattling;
the escutcheon being operable to be urged against the vehicle area and sequentially cause
   the escutcheon to engage the escutcheon camming face and permit the escutcheon to cammingly move over the locking lug,
   the escutcheon to engage and resiliently deflect the spring portion of the vehicle area locking tab,
   the locking lug of said vehicle area to be received by the locking lug receiving recess of the escutcheon, and
   the escutcheon biasing extension of the locking tab to engage the escutcheon and resiliently bias the lug receiving face into cover rattle restraining engagement with the escutcheon locking face.

Other independently significant and valuable aspects of the invention reside in structural features as delineated in the appended claims.

DRAWINGS

In describing the invention, by way of example, reference will be made to the appended drawings in which:

FIGS. 10–12 schematically depict the known prior art arrangement described above, with FIG. 10 depicting in fragmentary perspective a console to mate with an escutcheon (cover);

DESCRIPTION OF PRESENTLY PREFERRED EMBODIMENTS

The ensuing discussion pertains to a unique concept relating to automobile escutcheon assemblies.

Consistent with terminology in the art and generally understood definitions, the term escutcheon as employed in this disclosure relates to a device intended to cover, in whole or in part, a portion of an area of a motor vehicle which is to be enhanced in appearance or otherwise shielded.

Traditionally, escutcheon assemblies are employed in relation to the location of shifter mechanisms in automobile vehicles, usually located between the driver and front passenger seat.

Such escutcheon assemblies conventionally involve an escutcheon base which fits directly over a transmission assembly and may be referred to as a "Console ESCN".

Completing this cover assembly, and overlying areas of the Console ESCN requiring at least partial coverage for purposes of enhanced appearance, is a concave escutcheon hereinafter identified at times as a "Cover ESCN".

At this juncture, it will be recognized that the term escutcheon as herein employed is generic in nature and relates to a covering mechanism intended to cover in whole or in part an area of a motor vehicle.

Generally, the Cover ESCN will be referred to as an escutcheon, cover or a trim component, consistent with general usage in the art, recognizing that these terms as thus employed are generally interchangeable and synonymous.

Figure 1:
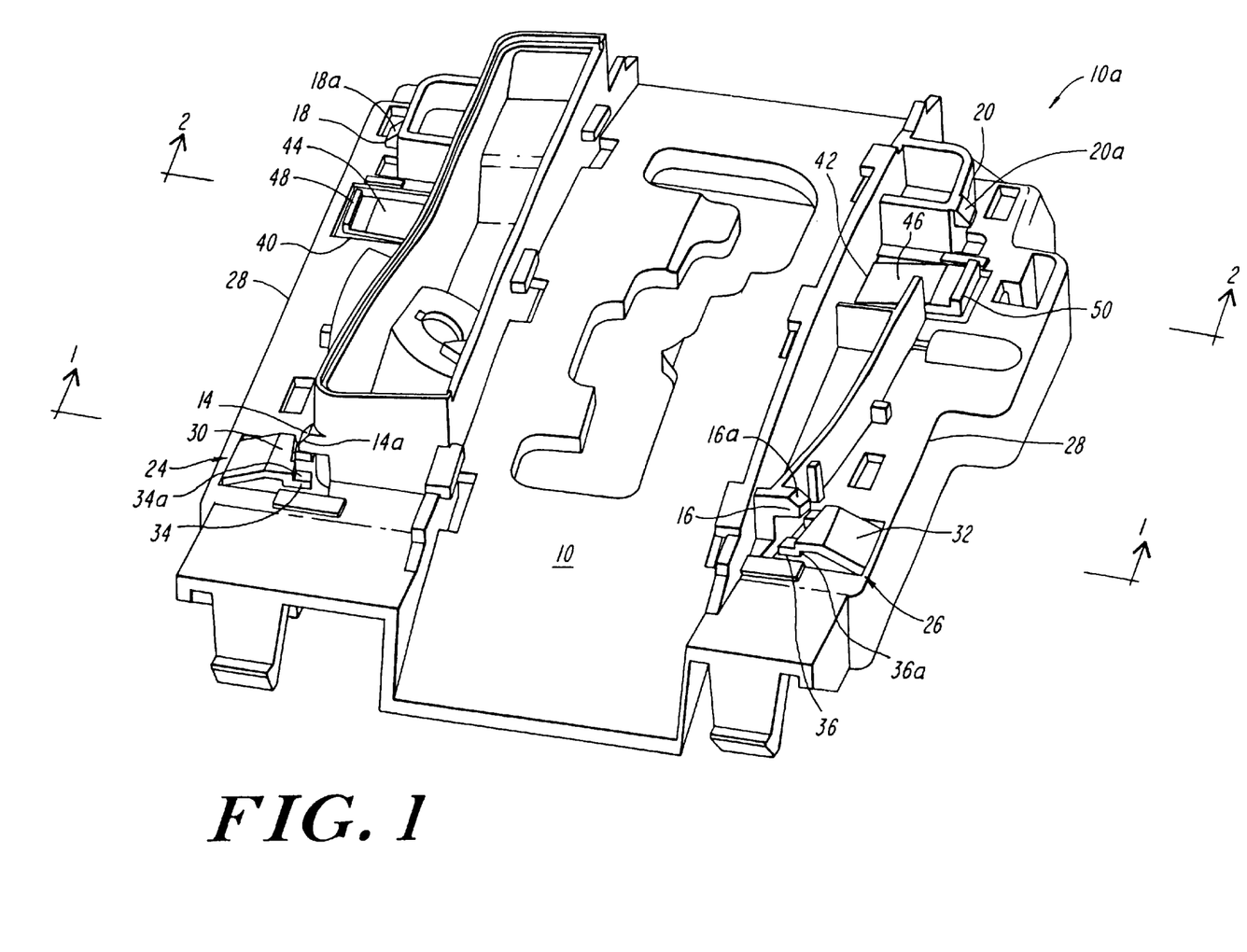
FIG. 1 schematically depicts, in a perspective format, a vehicle transmission shifter console intended to be partially covered by an escutcheon for the purpose of enhancing the appearance of the overall console assembly.
Figure 1A:
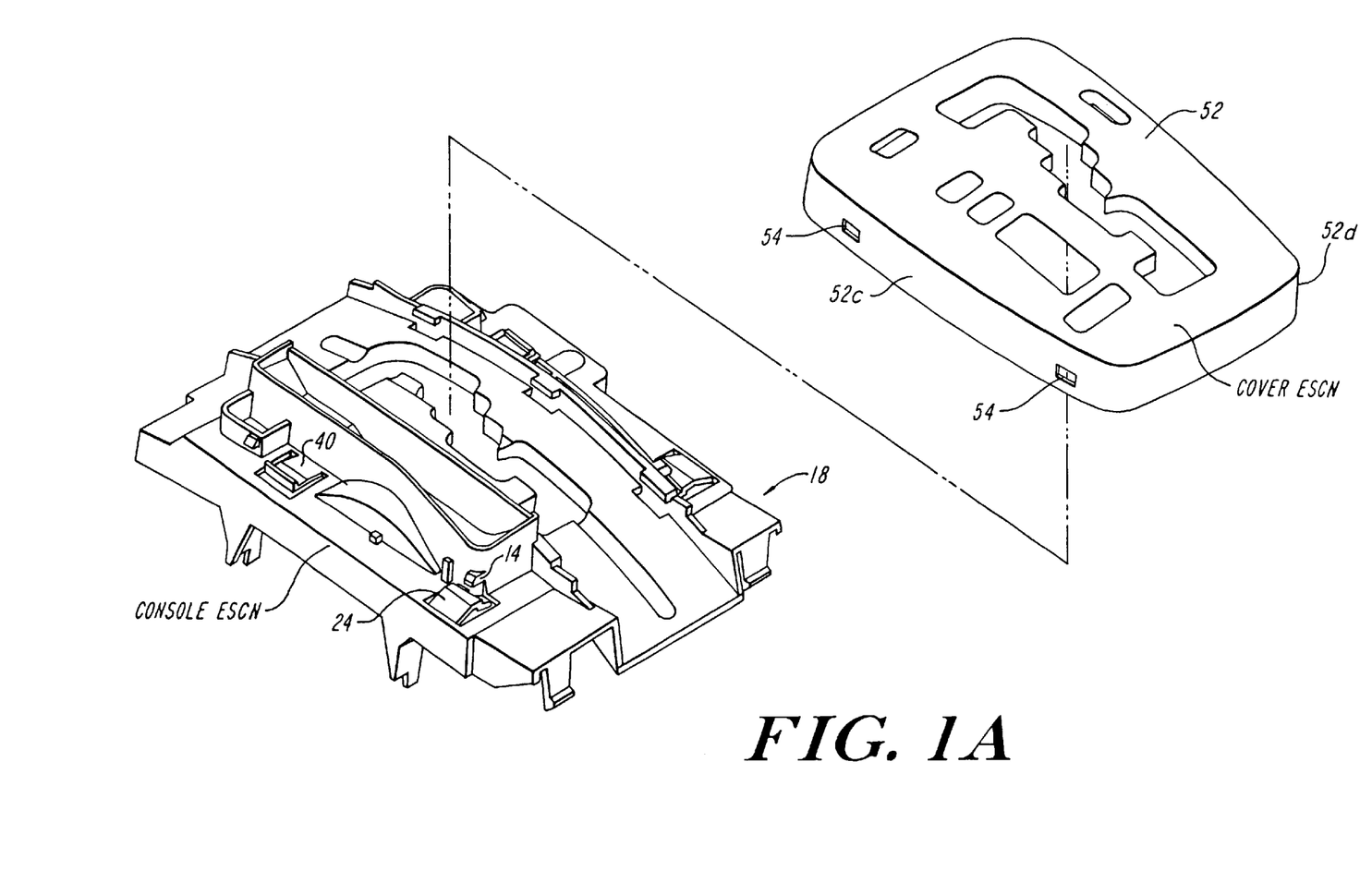
FIG. 1a schematically depicts the FIG. 1 console in relation to a separated escutcheon cover component.

FIGS. 1 and 1a show the apparatus of the present invention for connecting an escutcheon or console cover (i.e., a trim member) 52 to the shifter base or console 10 of a motor vehicle (10a). The console cover or escutcheon 52 will be generally concave and operable to cover exposed console areas. The configuration of this escutcheon will vary in accordance with console configurations, as is well understood in the art.

The shifter base 10, in essence comprises a portion of an automotive vehicle 10a, and, as shown in FIGS. 1 and 1a, includes four extensions 14, 16, 18, 20 extending outwardly from the shifter base 10. The escutcheon cover 52, i.e., has four holes, each corresponding to one of the four extensions 14, 16, 18, 20 extending from the shifter base 10.

Figure 6:
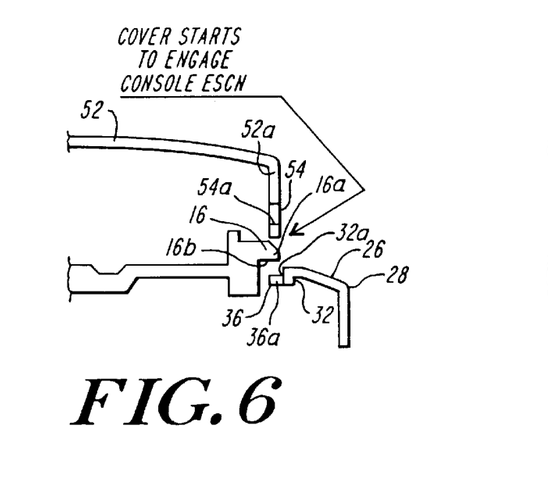
FIG. 6 depicts another component format which may be employed in connection with the bottom portion of the console of FIG. 1, with the components thereof being viewed along section line 2—2, here again it being understood that the console and escutcheon are shown in fragmentary form only, with their overall configuration being dependent upon a particular configuration of the vehicle involved.
Figure 7:
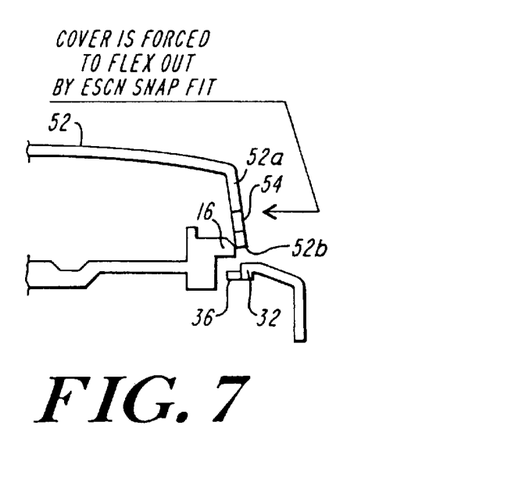
FIG. 7 depicts the FIG. 6 components during the initiation of escutcheon and console assembly engagement, with the escutcheon sides beginning to flex laterally outward to permit locking cooperation with the console assembly.
Figure 8:
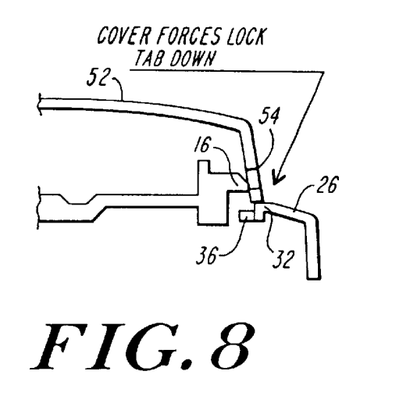
FIG. 8 depicts the FIG. 6 components after the escutcheon has moved downwardly over the console assembly and engaged a resilient locking tab which serves to facilitate connection and restrain the assembled components from rattling.

The lug defining extensions 14, 16, 18, and 20 are provided respectively, with upwardly facing and outwardly and downwardly sloping, i.e., tapered, cam surfaces 14a, 16a, 18a, and 20a as shown in FIG. 1. These lugs are also provided with downwardly facing, flat locking surfaces extending laterally and horizontally outwardly of console 10 and operable to abuttingly engage the lower portions of cover side recess walls 54a, defining the recesses 54, viewing the lugs as shown in the appended drawings. Representative locking surfaces 16b and 20b are shown in FIGS. 6 and 2, respectively.

As shown in FIGS. 6–9, two lock tabs 24, 26 are formed in the shifter base 10 for biasing the cover into engagement with the rearward extensions 14, 16 that extend from the shifter base 10. Each of these tabs 24, 26 extends inwardly from an outer edge 28 of the shifter base 10 in opposition to the corresponding extensions 14, 16. The lock tabs 24, 26, respectively, have body portions 30, 32 connected to the shifter base 10 and lower extension portions 34, 36 extending from the body portions 30, 32. These body portions are operable to deflect downwardly below a horizontal plane as shown in FIG. 6–9 and rotate upwardly to a restored condition.

During assembly, which is shown in FIGS. 6–9, the escutcheon cover sides 52a and 52c force the body portions 30, 32 down until the extensions 14, 16 fit into the holes 54 (only one is shown in FIGS. 6–9) of the cover 52. This engagement is facilitated by camming engagement of the cover sides 52a and 52c with outwardly and downwardly sloping cam faces 16a and 14a carried by the lugs 16 and 14, respectively. The lower ledge extension portions 34, 36 transmit residual spring force to bias the escutcheon cover 52 upwardly against each of the extensions 14, 16 to further create a tight fit.

Figure 2:
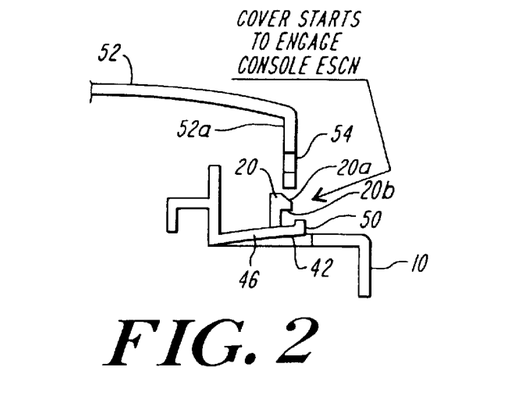
FIG. 2 provides a cross sectional view of an escutcheon (cover) about to be installed on the console of FIG. 1, with the cover being shown in fragmentary portion only, it being understood that this console cover or escutcheon may assume a variety of configurations, depending upon the console assembly with which it is to be mated, with FIG. 2 depicting the components along the section line 1—1 of FIG. 1.
Figure 3:
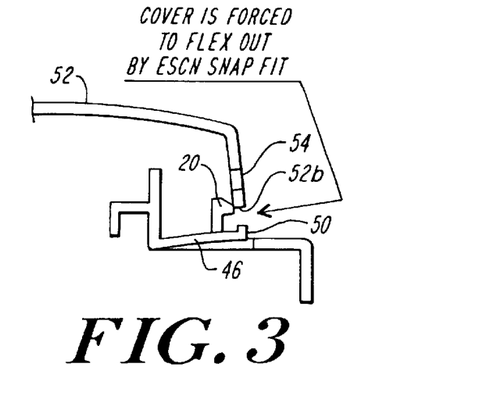
FIG. 3 illustrates the FIG. 2 assembly with the cover commencing to engage the console and the escutcheon side beginning to bow or flex outwardly to permit mating assembly.
Figure 4:
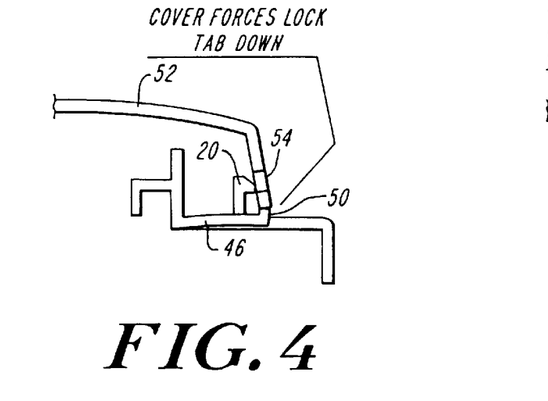
FIG. 4 illustrates the FIG. 2 assembly after the escutcheon has moved downwardly over the console sufficiently to engage a resilient locking tab which serves to facilitate assembly and securing of the escutcheon.

As FIGS. 2–5 show, two additional tabs 40, 42 are formed in the shifter base 10 for biasing the escutcheon into engagement with the remaining two extensions 18, 20. Each of these tabs 40, 42 extends outwardly from the shifter base 10 parallel to (i.e., in opposition to) the extensions 18, 20. The lock tabs 40, 42, respectively, have body portions 44, 46 connected to the shifter base 10 and extension portions 48, 50 extending form the body portions 44, 46. Body portions 44, 46 are disposed above, a horizontal plane as shown in FIG. 2, are downwardly deflectable and operable to rotate back to the restored conditions of FIG. 5.

During assembly, which is shown in FIGS. 2–5, the lower edge 52 of the escutcheon cover sides 52a and 52c camn-mingly engage an upper, outwardly and downwardly sloping cam face 20a of the lug or extension 20 and corresponding elements on lug 18. This engagement force the body portions 44, 46 down until the extensions fit into the remaining holes 54 (only one is shown in this view) of the escutcheon cover 52. The body portions 44, 46 of the lock tabs 40, 42 provide residual spring force to bias the escutcheon cover 52 upwardly to create a tight fit. The extension portions 48, 50 transmit a residual spring force to bias the escutcheon cover 52 inwardly against the extensions 18, 20 to create a tight fit.

As herein before described, the unique flexible tab securing arrangements of the present invention serves to provide multi directional biasing of the escutcheon 52 into anti-rattling cooperation with the console 10.

Upward Biasing Feature—FIGS. 6–9

In the case of the FIGS. 6–9 arrangement, the extensions of the tabs 30 and 32, such as extension 36a shown in FIG. 6, provide a resilient lifting force operating on the underside 52b of the sides 52a of the escutcheon 52, thereby causing the recess defining apertures 54 to be biased resiliently upwardly against the retaining lugs or extensions 14 and 16. Thus, as shown in connection with the representative view of FIG. 6 pertaining to locking tab or securing tab 32, the recess defining face 54a, which defines a recess 54, is brought into resiliently biased engagement with the under or locking surface 16b of the abutment 16 when the escutcheon 52 is finally assembled in the configuration shown in FIG. 9.

Figure 9:
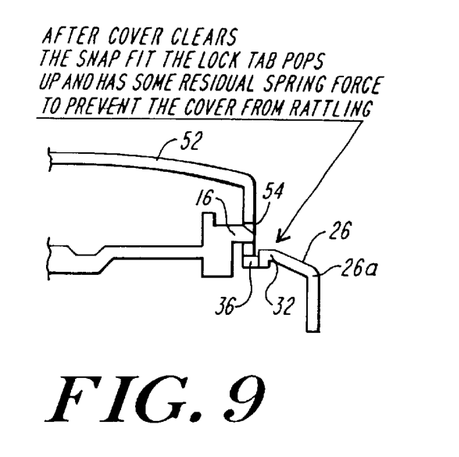
FIG. 9 depicts the FIG. 6 components in their assembled condition, with the locking tab engaging the under edge of the side of the escutcheon so as to resiliently bias the escutcheon into secured cooperation with the console assembly and thereby prevent escutcheon rattling.

Movement of escutcheon sidewall 52a from the engagement initiating position of FIG. 6 to the installed position of FIG. 9 is facilitated by the camming face 16a carried by extension defining lug 16.

The extension portion 36 includes a downwardly stepped ledge portion 36a which junctures with the body portion 32 at a shoulder 32a. With this arrangement, and with the cover side 52a deflecting inwardly from the FIG. 8 to the FIG. 9 positions as the aperture 54 receives the extension lug 16, the lower edge 52b of the side 52a engages the ledge 36a, with the resilience of the body portion 32 exerting a resilient, upwardly directed force against the escutcheon side 52a, urging this side into anti-rattling cooperation with the lug 16.

As will be appreciated, the heretofore described engagement of the escutcheon 52 with the console 10 in connection with FIGS. 6–9 occurs through the result of manual force exerted on the cover 52 without the need to employ separate tools.

Similarly, the cover or escutcheon 52 may be removed from the console 10 without tools by simply pressing the locking tabs 26 and 24, and either pressing the escutcheon 52 downwardly to cam the side 52a and 52c laterally away from the extensions 16 and 14 or prying the sides laterally, thereby freeing the securing recesses 54 from the lugs 16 and 14.

As will be appreciated, the discussion herein presented in connection with the locking, anti-rattling and removal aspects of the escutcheon and cover in connection with lug 16 and tab 26 is equally applicable to the counterpart lug 14 and tab 24 on the opposite side of the console 10 as depicted in FIG. 1.

Inward and Upward Biasing Features—FIGS. 2–5

In the case of the FIGS. 2–5 arrangement the body portions of tabs 40 and 42, such as body portions 46 shown in FIG. 2, provide a lifting force operating on the underside 52b of the sides 52a and 52c of the escutcheon 52, thereby causing the recess defining apertures 54 to be biased resiliently upwardly against the retaining lugs or extensions 18 and 20. Thus, as shown in connection with the representative view of FIG. 2 pertaining to locking tab or securing tab 42, the recess defining face 54a, which defines a recess 54, is brought into resiliently biased engagement with the under or locking surface 20b of the abutment 20 when the escutcheon 52 is finally assembled in the configuration shown in FIG. 5.

Figure 5:
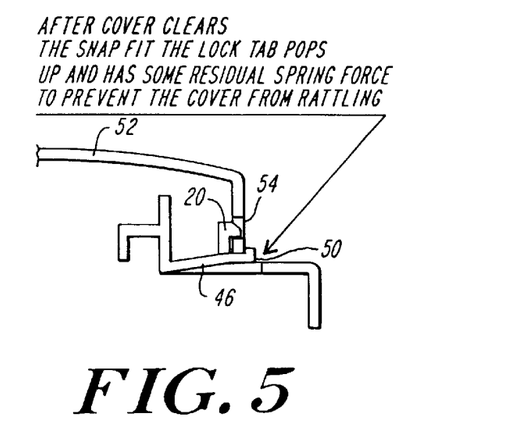
FIG. 5 depicts the FIG. 2 components in their assembled condition, with an escutcheon recess lockingly secured with a console lug and with a locking tab serving to effectively bias the escutcheon against the console so as to substantially secure the console against rattling.

Movement of escutcheon sidewall 52a from the engagement initiating position of FIG. 2 to the installed position of FIG. 5 is facilitated by the camming face 20a carried by extension defining lug 20.

The upwardly projecting extension portion 50 junctures with the body portion 46. With this arrangement, and with the cover side 52a deflecting inwardly from the FIG. 4 to the FIG. 5 positions as the aperture 54 receives the extension lug 20, the lower edge 52b of the side 52a engages the outer portion of body portion 46, with the resilience of the body portion 46 resulting in the portion 46 exerting a lifting force on one side 52a, resiliently urging face 54a against lug locking face 20b. It will be appreciated that in the FIG. 5 position, the extension shoulder 50, disposed in its escutcheon or cover locking position, is somewhat resiliently biased inwardly. The resultant partial flexure or bowing of body portion 32 of the tab 42, coupled with the arcuate movement of the body 46 downwardly tending to decrease the spacing between the tab extension 52 and the lug 20 during upward flexing movement of the tab 42, contributes to the inwardly directed resilient biasing force acting on the cover side 52a to provide the desired anti-rattling effect in combination with the lifting bias above described.

As will be appreciated, the heretofore described engagement of the escutcheon 52 with the console 10 in connection with FIGS. 2–5 occurs through the result of manual force exerted on the cover 52 without the need to employ separate tools.

Similarly, the cover or escutcheon 52 may be removed from the console 10 in the area of tab 42, without tools, by simply pressing the extension 50 of the locking tab 42 downwardly so as to free the side 52a from the restraining influence of shoulder defining extension 50.

As will be appreciated, the discussion herein presented in connection with the locking, anti-rattling and removal aspects of the escutcheon and cover in connection with lug 20 and tab 46 is equally applicable to the counterpart lug 18 and tab 40 on the opposite side of the console 10 as depicted in FIG. 1.

Unique Advantages of Each Tab Format

As will be appreciated, each of the alternative locking tab configurations shown in connection with FIGS. 2–5 and FIGS. 6–9 has unique advantages.

The arrangements shown in FIGS. 2–5 presents the advantages of tab structures which are themselves covered by the escutcheon 52 while the tab assemblies of FIGS. 6–9 afford the advantages of enhanced access for escutcheon removal purposes.

As will be appreciated, the particular configurations of locking tabs employed will vary in accordance with operating and space requirements of individual situations. The locking tab configurations used throughout may be the same as those shown in either FIGS. 6–9 or in FIGS. 2–5. In appropriate circumstances, both configurations may be employed in one or more locations.

It will also be appreciated that the different forms of locking tab extensions disclosed herein may be configured so as to afford unique advantages. For example, as is shown in FIG. 1, the tab extensions 34 and 36 are bifurcated so as to define two fingers disposed on opposite sides of the locations, respectively, of extension lugs 14 and 16. This provides clearance, during the releasing of plastic cover 52 from a mold, with respect to these molded lugs.

As is shown in FIGS. 1 and 6, the tab body defined shoulder, such as shoulder 32a, may be slanted or curved so as to matingly conform to the secured outer peripheries of sides 52a and 52b.

Contrast With Prior Art Structure

As heretofore described, it will be apparent that the present invention affords unique advantages in relation to the prior art structure discussed above and generally depicted in FIGS. 10–12.

Figure 10:
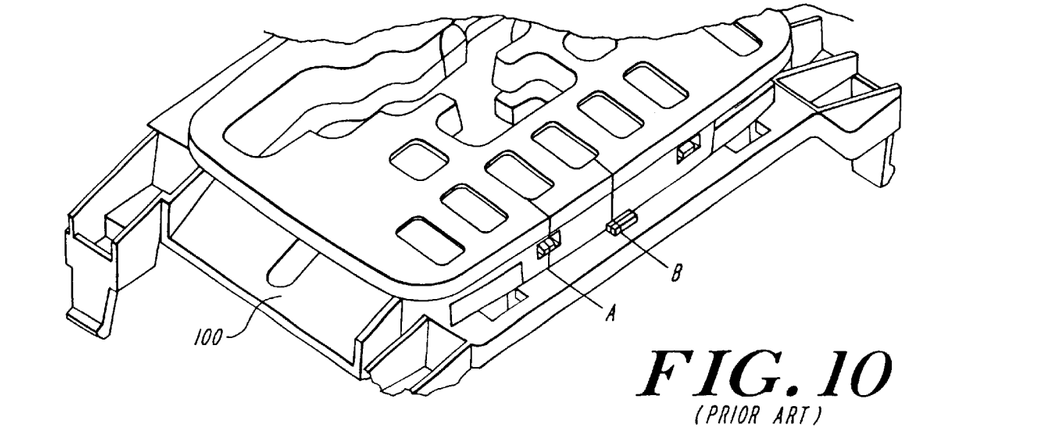
Figure 11:
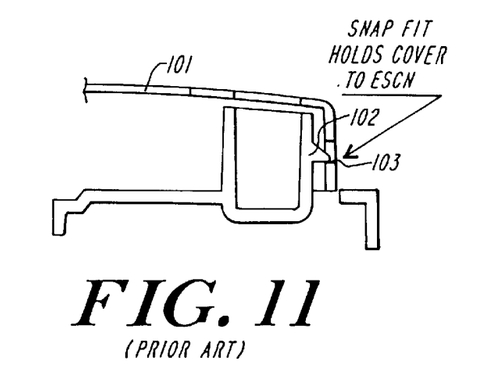
FIG. 11 provides a sectional view of the FIG. 10 along section line A depicting an escutcheon assembled on the console of FIG. 10 by way of a conventional snap fit, and FIG. 12 provides a sectional view of FIG. 10 along section line B depicting a console lug, displaced from the snap fit area of FIG. 11, which serves to lock the escutcheon side against the console.
Figure 12:
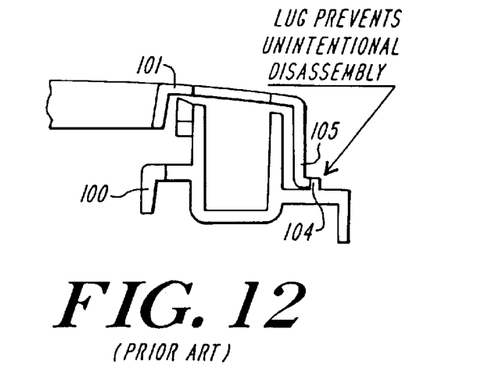

In the prior art arrangement shown in FIGS. 10–12, console carried extensions or lugs 102 are aligned with locking apertures 103 carried by the escutcheon or cover 101. Thus, when the escutcheon 101 is pressed downwardly over the console 100, the cover aperture 103 are brought into snap-fitting cooperation with the console lugs or extensions 102. This cooperation is shown in FIG. 11, viewed along section "A" of FIG. 10.

Instead of the resilient securing and anti-rattling tab features of the present invention, the prior art structure as shown in FIGS. 10–12 simply employs console lugs 104 to secure the edges 105 of the cover 101, with precision manufacturing tolerances being relied upon to obtain an appropriate fit between the cover 101 and the base or console 100. However, as will be understood, such manufacturing arrangements leave other gaps, as schematically depicted in FIG. 12 which are conducive to undesired rattling.

As is shown in FIGS. 10 and 12, the securing lugs 104 are displaced along the sidewall of the cover 101 from the snap fit areas comprising lugs 102 and recesses 103. Even with this displacement, the solid lug securing arrangement makes manual or tool removal of the cover or escutcheon 101 difficult, often resulting in breakage of the cover 101.

In contrast, the present invention permits escutcheon or cover installation without the requirement of special tools and the risk of component breakage. Such actions with the present invention, may be effected manually. While typical—as opposed to highly precision—manufacturing tolerances may be maintained, the securing arrangement of this invention provides a unique, resilient, anti-rattling or rattling deterrence function, tending to prevent undesired rattling of the cover or escutcheon relative to the console.

OVERALL SUMMARY OF INVENTION

The independently significant major aspects of the invention as discussed at the outset of this disclosure may now be summarized in the context of the presently preferred detailed embodiment, these major aspects being as follows.

A first major aspect involves the following concept:

An apparatus is provided for securably connecting an escutcheon 52 to a shifter base 10 of a motor vehicle 10a, this apparatus comprising:

first and second extensions (14, 16 or 18, 20) extending outwardly from the shifter base 10;

the escutcheon 52 having first and second holes 54 corresponding to the first and second extensions extending from the shifter base; and at least one tab (24 or 26 or 40 or 42) formed in the shifter base for biasing the escutcheon into engagement with one of the first and second extensions, with the at least one tab providing spring support for holding the escutcheon rigidly against the shifter base.

A second major aspect involves the following concept:

An apparatus for securably connecting an escutcheon 52 to a shifter base 10 of a motor vehicle 10a, comprising:

first, second, third, and fourth extensions (18, 20, 14, 16) extending outwardly from the shifter base 10;

the escutcheon 52 having first, second, third, and fourth holes 54 corresponding to the first, second, third, and fourth extensions extending from the shifter base;

first and second tabs (24, 26) formed in the shifter base for biasing the escutcheon into engagement with the first and second extensions (14, 16), with each of the first and second tabs (24 or 26) defining a lock tab extending inwardly from an outer edge of the shifter base in opposition to one of the first and second extensions;

the lock tab (24 or 26) having a body portion (30 or 32) connected to the shifter base (10) and a lower extension portion (34 or 36) extending from the body portion;

the escutcheon forcing the body portion down until one of the first and second extensions fits into one of the first and second holes;

the lower extension portion (34 or 36) providing residual spring force to bias the escutcheon (52) upwardly against one of the first and second extensions (14 or 16) to create a tight fit;

third and fourth tabs (40, 42) formed in the shifter base for biasing the escutcheon 52 into engagement with the third and fourth extensions (18, 20);

each of the third and fourth tabs (40 or 42) defining a second lock tab extending outwardly from the shifter base parallel to one of the third and fourth extensions, the second lock tab having a body portion (44 or 46) connected to the shifter base (10) and an extension portion (48 or 50) extending from the body portion;

the escutcheon forcing the body portion down until one of the third and fourth extensions fits into one of the third and fourth holes, the body portion (44 or 46) of the second lock tab providing residual spring force to bias the escutcheon 52 upwardly to create a tight fit; and the lower extension portion (48 or 50) providing residual spring force to bias the escutcheon inwardly against one of the third and fourth extensions (18 or 20) to create a tight fit.

A third major aspect entails the following combination:

An apparatus for securably connecting a trim member (52) to a body component (10) of a motor vehicle (10*a*), comprising:

at least one extension (18, 20, 14 or 16) extending outwardly from the body component (10);

the trim member (52) having at least one hole (54) corresponding to the at least one extension extending from the body component; and at least one tab (40, 42, 24 or 26) formed in the body component for biasing the trim member into engagement with the at least one extension, with the at least one tab providing spring support for holding the trim member rigidly against the body component.

A fourth major independently significant aspect entails the following combination:

An interactive vehicle console area to be covered and an escutcheon comprising:

a vehicle 10*a* including a vehicle area 10 to be covered;

an escutcheon 52 operable to be manually and detachably engaged with the vehicle area, be manually removed from the vehicle area, and be restrained from rattling in response to detachable engagement with the vehicle area;

at least one locking lug 14, 16, 18, or 20, carried by the vehicle area, and including an escutcheon camming face (14*a*, 16*a*, 18*a* or 20*a*), and an escutcheon locking face (14*b*, 16*b*, 18*b*, or 20*b*);

at least one recess face 54*a* defining a locking lug receiving recess 54 carried by the escutcheon; and at least one locking tab (24, 26, 40 or 42) carried by the vehicle area and including a spring portion (30, 32, 44 or 46) operable to resiliently deflect away from the escutcheon in response to engagement of the escutcheon with the vehicle area in the course of initiating detachable engagement with the vehicle area, and an escutcheon biasing extensions (34, 36, 48 or 50) operable to resiliently urge the recess face defining the locking lug receiving recess into biasing engagement with the escutcheon locking face and restrain the escutcheon from rattling;

the escutcheon being operable to be urged against the vehicle area and sequentially cause the escutcheon to engage the escutcheon camming face and permit the escutcheon to cammingly move over the locking lug, the escutcheon to engage and resiliently deflect the spring portion of the vehicle area locking tab, the locking lug of the vehicle area to be received by the locking lug receiving recess of the escutcheon, and the escutcheon biasing extensions of the locking tab to engage the escutcheon and resiliently bias the lug receiving face into cover rattle restraining engagement with the escutcheon locking face.

SUMMARY OF ADVANTAGES, NON-OBVIOUSNESS, AND SCOPE OF INVENTION

This invention offers particular advantage in connection with facilitating the manual assembly and disassembly of a cover or escutcheon in relation to a vehicle area to be covered such as a console, and in particular a transmission shifter console.

The unique configurations of the flexible locking tabs carried by the area to be covered advantageously cooperate with the sides of the cover or escutcheon to facilitate locking engagement of the cover or escutcheon with the vehicle area to be covered while readily permitting disassembly of these components without incurring component damage or destruction and usually without requiring special tools.

The resilient securing tab assemblies herein described function uniquely to prevent rattling of the assembled escutcheon relative to the area to be covered. This is accomplished in each of the FIGS. 2–5 and FIGS. 6–9 embodiments by resiliently, upwardly biasing the escutcheon-carried recess defining walls against securing or locking lugs carried by the area to be covered and, in the case of the FIGS. 2–5 embodiment, by also resiliently biasing the escutcheon laterally against the body of the vehicle area to be covered and which provides the locking lugs.

Those familiar with this disclosure and familiar with the vehicle escutcheon art may well recognize additions, deletions, substitutions, equivalents or other modifications all of which would be deemed to fall within the purview of the appended claims.

What is claimed is:

1. An apparatus for securably connecting an escutcheon to a shifter base of a motor vehicle, comprising:

first and second extensions extending outwardly from said shifter base;

said escutcheon having first and second holes corresponding to said first and second extensions extending from said shifter base; and at least one tab formed in said shifter base for biasing said escutcheon into engagement with one of said first and second extensions;

said at least one tab providing spring support for holding said escutcheon rigidly against said shifter base;

said at least one tab including a spring portion operable to resiliently deflect away from said escutcheon in response to engagement of said escutcheon with said shifter base in the course of initiating detachable engagement of said escutcheon with said shifter base, with said spring portion deflecting in a first direction generally aligned with a direction of escutcheon movement initiating said engagement, and an escutcheon biasing portion operable to resiliently urge said escutcheon in a second direction generally opposite to said first direction and toward and into biasing engagement with said one of said extensions and restrain said escutcheon from rattling; and said escutcheon being operable to be urged against said shifter base and sequentially cause said escutcheon to engage said one of said extensions and permit said escutcheon to move over said one of said extensions, said escutcheon to engage and resiliently deflect said spring portion of said at least one tab generally in said first direction away from said escutcheon, said one of said extensions to be received by said escutcheon, and said escutcheon biasing portion of said one of said tabs to engage said escutcheon and resiliently bias said escutcheon in said direction directly generally opposite to said first direction and into rattle restraining engagement with said one of said extensions.

2. The apparatus of claim 1 wherein said at least one tab comprises:

a pair of tabs formed in said shifter base for biasing said escutcheon into engagement with said first and second extensions, said tabs providing spring support for holding said escutcheon rigidly against said shifter base.

3. The apparatus of claim 1 wherein:

said first and second extensions each have a flat and horizontal lower edge and a tapered upper edge.

4. An apparatus for securably connecting an escutcheon to a shifter base of a motor vehicle, comprising:

first, second, third, and fourth extensions extending outwardly from said shifter base;

said escutcheon having first, second, third, and fourth holes corresponding to said first, second, third, and fourth extensions extending from said shifter base;

first and second tabs formed in said shifter base for biasing said escutcheon into engagement with said first and second extensions, each of said first and second tabs defining a lock tab extending inwardly from an outer edge of said shifter base in opposition to one of said first and second extensions;

said lock tab having a body portion connected to said shifter base and a lower extension portion extending from said body portion;

said escutcheon forcing said body portion down until one of said first and second extensions first into one of said first and second holes;

said lower extension portion providing residual spring force to bias said escutcheon upwardly against one of said first and second extensions to create a tight fit;

third and fourth tabs formed in said shifter base for biasing said escutcheon into engagement with said third and fourth extensions;

each of said third and fourth tabs defining a second lock tab extending outwardly from said shifter base parallel to one of said third and fourth extensions, said second lock tab having a body portion connected to said shifter base and an extension portion extending from said body portion;

said escutcheon forcing said body portion down until one of said third and fourth extensions fits into one of said third and fourth holes;

said body portion of said second lock tab providing residual spring force to bias said escutcheon upwardly to create a tight fit; and said extension portion providing residual spring force to bias said escutcheon inwardly against one of said third and fourth extensions to create a tight fit.

5. The apparatus of claim 4 wherein:

said lock tab of each of said first and second tabs is in direct opposition to each of said first and second extensions.

6. The apparatus of claim 4 wherein:

said first, second, third, and fourth extensions each have a flat and horizontal lower edge and a tapered upper edge.

7. An interactive vehicle console area to be covered and an escutcheon comprising:

a vehicle including a vehicle area to be covered;

an escutcheon operable to be manually and detachably engaged with said vehicle area, be manually removed from said vehicle area, and be restrained from rattling in response to said detachable engagement with said vehicle area;

at least one locking lug, carried by said vehicle area, and including an escutcheon camming face, and an escutcheon locking face;

at least one recess face defining a locking lug receiving recess carried by said escutcheon; and at least one locking tab carried by said vehicle area and including a spring portion operable to resiliently deflect away from said escutcheon in response to engagement of said escutcheon with said vehicle area in the course of initiating said detachable engagement with said vehicle area, and an escutcheon biasing extension operable to resiliently urge said recess face defining said locking lug receiving recess into biasing engagement with said escutcheon locking face and restrain said escutcheon from rattling;

said escutcheon being operable to be urged against said vehicle area and sequentially cause said escutcheon to engage said escutcheon camming face and permit said escutcheon to cammingly move over said locking lug, said escutcheon to engage and resiliently deflect said spring portion of said vehicle area locking tab, said locking lug of said vehicle area to be received by said locking lug receiving recess of said escutcheon, and said escutcheon biasing extension of said locking tab to engage said escutcheon and resiliently bias said lug receiving face into cover rattle restraining engagement with said escutcheon locking face.

8. An apparatus for securely connecting an escutcheon to a shifter base of a motor vehicle, comprising:

first and second extensions extending outwardly from said shifter base;

said escutcheon having first and second holes corresponding to said first and second extensions extending from said shifter base;

at least one tab formed in said shifter base for biasing said escutcheon into engagement with one of said first and second extensions;

said at least one tab providing spring support for holding said escutcheon rigidly against said shifter base;

said at least one tab comprising a pair of tabs formed in said shifter base for biasing said escutcheon into engagement with said first and second extensions, said tabs providing spring support for holding said escutcheon rigidly against said shifter base;

each tab of said pair of tabs comprising a lock tab extending inwardly from an outer edge of said shifter base in opposition to one of said first and second extensions, said lock tab having a body portion connected to said shifter base and a lower extension portion extending from said body portion;

said escutcheon forcing said body portion down until one of said first and second extensions fits into one of said first and second holes; and said lower extension portion providing residual spring forces to bias said escutcheon upwardly against one of said first and second extensions to create a tight fit.

9. The apparatus of claim 8 wherein:

said lock tab of each of said tabs of said pair of tabs is in direct opposition to each of said first and second extensions.

10. An apparatus for securely connecting a trim member to a body component of a motor vehicle comprising:

at least one extension extending outwardly from said body component;

said trim member having at least one hole corresponding to said at least one extension extending from said body component; and at least one tab formed in said body component for biasing said trim member into engagement with said at least one extension;

said at least one tab proving spring support for holding said trim member rigidly against said body component;

said at least one tab including a spring portion operable to resiliently deflect away from said trim member in response to engagement of said trim member with said body component in the course of initiating detachable engagement of said trim member with said body component, with said spring portion deflecting in a first direction generally aligned with a direction of trim member movement initiating said engagement, and a trim member biasing portion operable to resiliently urge said trim member in a second direction generally opposite to said first direction and toward and into biasing engagement with said one of said extensions and restrain said trim member from rattling; and said trim member being operable to be urged against said body component and sequentially cause said trim member to engage said one of said extensions and permit said trim member to move over said one of said extensions, said trim member to engage and resiliently deflect said spring portion of said at least one tab generally in said first direction away from said trim member, said one of said extensions to be received by said trim member, and said trim member biasing portion of said one of said tabs to engage said trim member and resiliently bias said trim member in said second direction directly generally opposite to said first direction and into rattle restraining engagement with said one of said extensions.

11. The apparatus of claim 10 wherein said at least one tab comprises:

a lock tab extending inwardly from an outer edge of said body component in opposition to said at least one extension said lock tab having a body portion connected to said body component and a lower extension portion extending from said body portion;

said trim member forcing said body portion down until said at least one extension fits into said at least one hole; and said lower extension portion providing residual spring force to bias said trim member upwardly against said at least one extension to create a tight fit.

12. The apparatus of claim 11 wherein:

said lock tab is in direct opposition to said at least one extension.

13. The apparatus of claim 10 wherein:

said at least on extension has a flat and horizontal lower edge and a tapered upper edge.

14. An apparatus for securely connecting an escutcheon to a shifter base of a motor vehicle, comprising:

first and second extensions extending outwardly from said shifter base;

said escutcheon having first and second holes corresponding to said first and second extensions extending from said shifter base;

at least one tab formed in said shifter base for biasing said escutcheon into engagement with one of said first and second extensions;

said at least one tab providing spring support for holding said escutcheon rigidly against said shifter base;

said at least one tab comprising
- a pair of tabs formed in said shifter base for biasing said escutcheon into engagement with said first and second extensions, said tabs providing spring support for holding said escutcheon rigidly against said shifter base;

each tab of said pair of tabs comprising
- a lock tab extending outwardly from said shifter base in parallel to one of said first and second extensions, said lock tab having
    - a body portion connected to said shifter base and
    - an extension portion extending from said body portion;

said escutcheon forcing said body portion down until one of said first and second extensions fits into one of said first and second holes;

said body portion of said lock tab providing residual spring force to bias said escutcheon upwardly to create a tight fit; and said extension portion providing residual spring force to bias said escutcheon inwardly against one of said first and second extensions to create a tight fit.

15. An apparatus for securably connecting a trim member to a body component of a motor vehicle, comprising:
- at least one extension extending outwardly from said body component;
- said trim member having at least one hole corresponding to said at least one extension extending from said body component; and
- at least one tab formed in said body component for biasing said trim member into engagement with said at least one extension;

said at least one tab providing spring support for holding said trim member rigidly against said body component;

said at least one tab comprising
- a lock tab extending outwardly from said body component in parallel to said at least one extension, said lock tab having
    - a body portion connected to said body component and
    - an extension portion extending from said body portion;

said trim member forcing said body portion down until said at least one extension fits into said at least one hole;

said body portion of said lock tab providing residual spring force to bias said trim member upwardly to create a tight fit; and said extension portion providing residual spring force to bias said trim member inwardly against said at least one extension to create a tight fit.

* * * * *